Oct. 29, 1968     J. C. WESTMORELAND     3,407,680
RECIPROCATING POWER ARRANGEMENTS

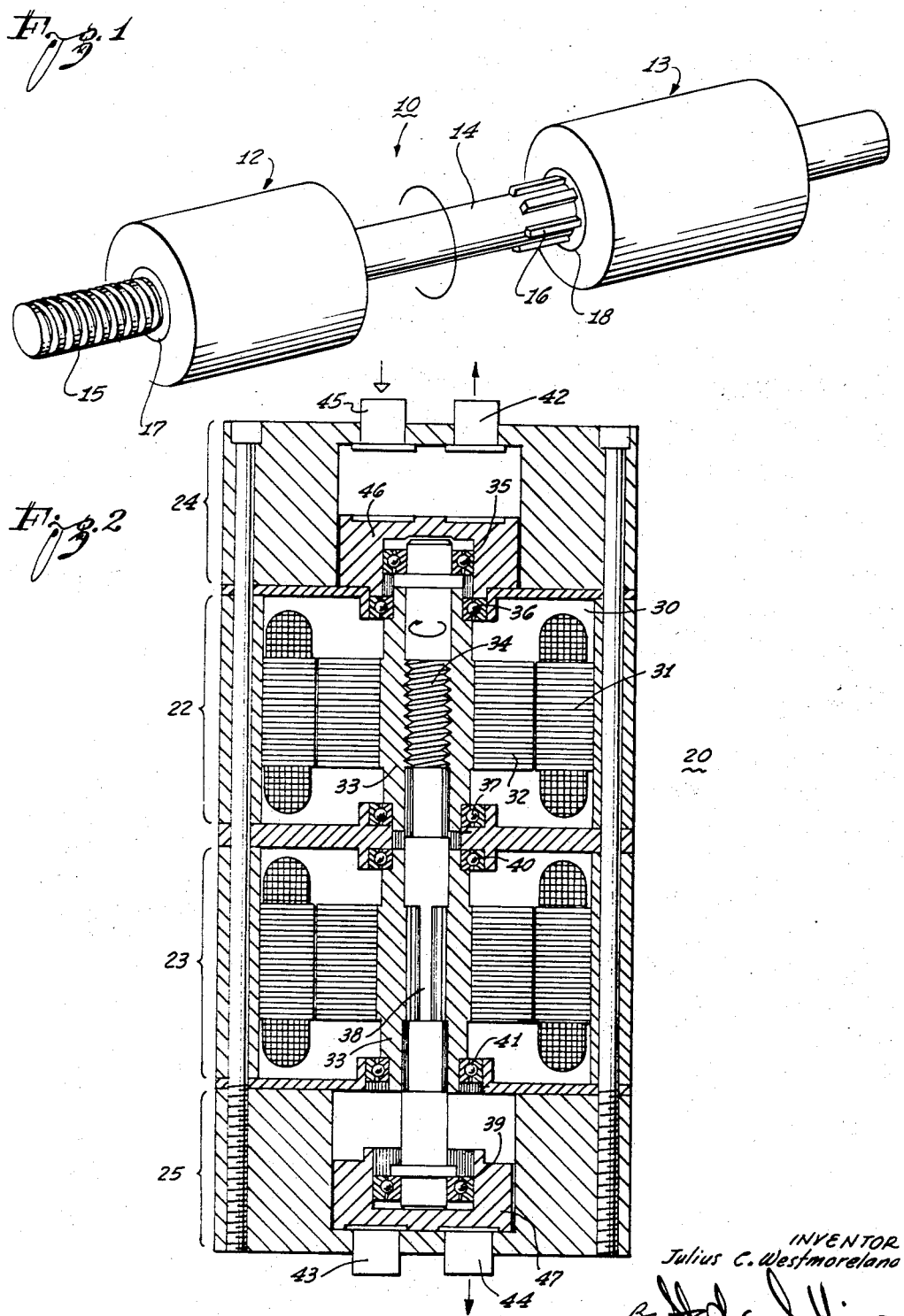

Filed Nov. 9, 1965     2 Sheets-Sheet 2

INVENTOR:
Julius C. Westmoreland
By Stephen D. King
Attorney

United States Patent Office 3,407,680
Patented Oct. 29, 1968

3,407,680
RECIPROCATING POWER ARRANGEMENTS
Julius C. Westmoreland, 6607 Avenida de las Pescas,
La Jolla, Calif.
Filed Nov. 9, 1965, Ser. No. 506,932
12 Claims. (Cl. 74—424.8)

ABSTRACT OF THE DISCLOSURE

A mechanical device for providing a reciprocating power output which utilizes two small high speed motors positioned to drive a single rotating shaft, one through a spline arrangement and the other through a screw arrangement, such that variations in motor speed provide a controlled, longitudinal reciprocating movement of the rotating shaft.

This invention relates to means for producing mechanical driven power and, more particularly, to an economical, compact source of mechanical reciprocating power.

There are many arrangements known for producing reciprocating motion; and such arrangements, in the proper context, provide adequate, useful output. However, previously-devised arrangements for producing reciprocating motion, in general, are large and bulky, utilize a number of highly-stressed components, and are incapable of providing a sufficient amount of useful output without complicated "step-up" arrangements. An improved source of reciprocating movement would prove especially advantageous in many situations. For example, the modern airplane has wing interiors which must house sources of reciprocating power for driving the movable control surfaces. However, wing interiors are not capable of housing substantial, bulky devices. Thus, compact sources must be used. And since small sources inherently provide small output force, a substantial, force step-up must be provided. This force step-up has heretofore utilized a gearing arrangement which is asymmetrical and has proven especially susceptible to wear, requiring replacement after very short periods of operation.

Numerous other situations suggest the need for a novel, compact source of reciprocating movement from which a substantial force output may be derived.

It is, therefore, a primary object of this invention to provide a unique source of reciprocating (cyclically-repeating) movement.

Another object of this invention is to derive a substantial force output from a source of reciprocating movement without the necessity of step-up gearing arrangements.

An additional object of this invention is to reduce the size of arrangements providing reciprocal movement.

Yet another object of this invention is to increase the reliability which may be expected of sources of reciprocating movement.

These and other objects of my invention are realized by a structure which comprises a rotating shaft and a pair of small, high-speed motors positioned axially along the shaft to effect its rotation. A first one of the motors surrounds the shaft and rotates it by means of a spline arrangement which will allow the shaft to shift axially in either direction while being rotated. The second one of the motors surrounds the shaft and drives it through a helical-thread arrangement. When the speeds of the two motors are the same, the threaded portions of the shaft and the threaded portion affixed to the second motor display no relative movement. When the speeds of the motors differ, however, there is relative rotational movement between the threads affixed to the second motor and the thread on the shaft. This relative movement causes the shaft to move axially like a screw in a direction depending upon the sense of the relative movement. By varying the speeds of the motors such that relative speed constantly changes by a small amount, first in one sense and then in the other sense, the shaft may be made to reciprocate. If the reciprocating motion is utilized, it may be made to provide a relatively high output force.

In one particular embodiment of my invention, the shaft is caused to abut, after a predetermined axial movement, upon a mechanical stop arrangement so that the rotational speed of the threaded motor is slowed, causing an axial movement in the opposite sense. Thus, by running the motor driving the threaded shaft portion at a rate slightly faster than the other motor, the device may be made to generate its own reciprocal movement. Other embodiments offer other features which have special advantages for particular purposes.

Other objects, features, and advantages of this invention will be better understood from the specific description which follows. The specific description should be read together with the drawings in which:

FIGURE 1 is a basic illustration of a shaft surrounded by a pair of motors arranged for driving the shaft to provide reciprocating motion in accordance with the invention;

FIGURE 2 is a cross-sectional view taken axially along the shaft of an arrangement less basic than that shown in FIGURE 1;

Figure 3:
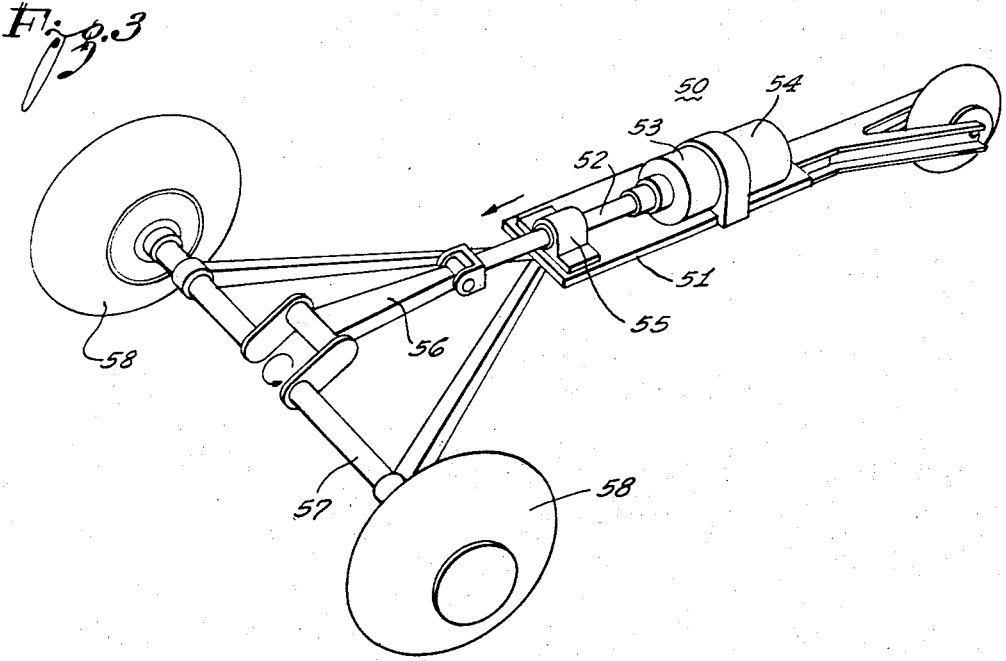
FIGURE 3 is an arrangement illustrating a use of the invention in a cart-like vehicle.

In FIGURE 1 is shown an arrangement 10 which may be conveniently utilized to illustrate the basic operation of my invention. The arrangement 10 includes a first motor 12 and a second motor 13 both of which are positioned to drive a shaft 14. The motor 12 surrounds a threaded portion 15 of the shaft 14 while the motor 13 surrounds a splined portion 16 of the shaft 14. The motor 12 has an internally-threaded, driven portion 17 which meshes with the threaded portion 15 of the shaft 14. The motor 13 has an internally-splined, driven portion 18 which meshes with the splined portion 16 of the shaft 14. These internal portions 17 and 18 of each of the motors 12 and 13 are arranged to move freely upon the shaft 14.

If the motors 12 and 13 are operated together in the same rotational direction (as shown by the arrow encircling the central portion of the shaft 14), the shaft 14 will rotate at the speed of operation of the internal portions of motors 12 and 13, but will remain axially stationary. If one of the motors, however, is operated at a speed slightly different from that of the other, the shaft 14 will progress axially. For example, if the motor 12 is operated at a slightly greater speed than the motor 13, the shaft 14 will progress to the right (as shown in the drawing). If on the other hand the motor 12 is operated at a slightly slower speed than the motor 13, the shaft 14 will progress to the left (as shown in the drawing).

This axial movement is caused in the following manner. The splined portion 16 of the shaft is free to move to the right and left within the internal driving portion 18 of the motor 13. The rotational speed difference between the two motors 12 and 13 causes the threaded portion 15 of the shaft 14 and the internal threaded portion 17 of the motor 12 to move relative to each other causing a screw-like action to take place. In other words, the motor 13 rotates shaft 14 at a particular speed. If the speed of the motor 12 is identical, the threaded shaft portion 15 merely rides within the threads of portion 17 driven by the motor 12. If the speed of the motor 12 varies from that of the motor 13, the threads work on each other and the shaft progresses to the right or left.

If one or the other of the motors can be controlled in such a manner as to vary its speed of operation about the normally-constant speed of the other, then the shaft 14 will be caused to reciprocate axially. Depending upon the pitch of threads of the threaded portion 15, upon the speed (and variation of speed) of rotation of the two motors 12 and 13, and upon the physical size of the various components, a reciprocal movement will be provided which may furnish substantial axial output force compared to the torque ratings of the individual motors.

A number of methods can be conceived for causing the selected motor to vary its speed about the norm of the rotational speed of the other motor. (It might also be noted that both motors might have their speeds varied coincidentally in particular situations.) One method which requires substantially no apparatus apart from the basic apparatus disclosed in FIGURE 1 utilizes a mechanical abutting arrangement (not shown in FIGURE 1) for limiting the axial movement of the shaft. It will be apparent upon considering the configuration 10 that if the axial movement of the shaft 14 is slowed or stopped when the motor 12 is, for example, moving slightly faster than the motor 13, the threaded portion 15 will exert a braking force upon the rotation of the threaded portion 17 of the motor 12. This braking action will cause the threaded portion 17 of the motor 12 to reduce its speed to slightly less than that of the motor 13 and of the threaded portion 15, thus causing the shaft 14 to reverse its direction of movement. As the reversal of movement occurs and the braking action of the threads 15 is withdrawn from the motor 12, the motor 12 will increase its speed and cause the shaft 14 again to reverse its direction of axial movement. This operation will continuously repeat itself, thereby providing a unique reciprocating motion.

In FIGURE 2 is shown a cross-sectional view of an arrangement 20 quite like that illustrated in FIGURE 1. The arrangement 20 has a central shaft portion along which are arranged an electric screw motor assembly 22, an electric spline motor assembly 23, and upper and lower piston and valve assemblies 24 and 25, respectively. The screw motor assembly 22 and the spline motor assembly 23 each comprises a physical mounting portion 30, a stator section 31, a rotor section 32, and a shaft drive portion 33. The drive portion 33 of the assembly 22 is screw-threaded and surrounds a mating screw-threaded central shaft portion 34. The drive portion 33 of assembly 22 is fixed to the rotor section 32 and is supported for rotation on bearings 36 and 37. The central shaft portion 34 rotates at its upper end on bearing 35.

The section 23 has a shaft drive portion 33 which is splined internally, supported on bearings 40 and 41, and surrounds a splined central shaft portion 38. The central shaft portion 38 and the central shaft portion 34 are joined together as one. The portion 38 rotates at its lower end on the bearing 39. The drive portions 33 are conveniently enlarged at the lower ends to allow the longitudinal shift of the larger portions of the central shaft.

When the two motors are driven at different speeds, the central shaft is either advanced or retracted, depending upon the sense of the differential speed. Only the difference in speeds controls the rate of the axial translation of the shaft for a given thread pitch. This is particularly important because it allows the absolute speed of each motor to be selected on the basis of design criteria other than the axial speed of the shaft.

In controlling the speed differential between the motors of the assemblies 22 and 23, the shaft may be selectively driven through any desired reciprocating motion. Furthermore, the axial thrust may be delivered during either the upward stroke or the downward stroke, or during both strokes. In the arrangement 20, the upward stroke delivers a power stroke to the upper pump assembly 24 through a piston 46 to provide exhaust through a valving mechanism including an exhaust valve 42. This same stroke operates a piston 47 in the lower pump assembly 25 to provide a vacuum and an intake via an intake valve 43. On the other hand, the opposite, downward, power stroke of the central shaft causes an exhaust operation at the lower pump assembly 25 transmitted via an exhaust valve 44 and an intake operation at an intake valve 45 of the upper pump assembly 24.

A number of variations may be made in the arrangement of FIGURE 2 for the sake of convenience or efficiency. For example, the threaded shaft portion 34 and the internally-threaded drive portion 33 may be mated in a ball-bearing screw assembly such as those which are well known in the art in order to provide maximum efficiency. A ball-bearing spline assembly may be similarly employed for the spline shaft portion 38.

The required speed differentials for causing the reciprocating motions may be produced through the application of either electrical or mechanical means. For example, electrical motor speed controls may be utilized with either of the assemblies 22 or 23. Such arrangements are relatively common in industry. A mechanical technique of speed control which would involve the aforementioned abutting means or a mechanical braking action applied to one of the motor assemblies of the two assemblies 22 and 23 might also be utilized.

Of particular interest is the fact that at no time during the operation of the arrangement 20 is the direction of rotation of either motor changed. Furthermore, with relatively high-speed motors, the variation of rotational speed may be minimized. In this manner, over 90 percent of the rotational inertia of each motor may be conserved due to the well balanced kinetic motion with its built-in fly-wheel effect.

Of further interest is the fact that very small, high-speed motors may be utilized to provide substantial output force in an axial sense while occupying but a small space. The advance or retraction of the shaft (and thus the force) is determined by the product of the screw pitch circumference and the tangent of the lead angle. When multiplied by the differential speed between the two motor assemblies 22 and 23, the velocity of translation for the axial motion is obtained. Thus, practically any form of reciprocating motion can be programmed into the design of the arrangement. Moreover, a number of units which have different reciprocating motions may be synchronized to provide varying programs of power strokes.

It should be noted that no matter how the variation of motor speed is provided, the system is inherently jam-proof. This result because as the shaft or a particular motor assembly begins to jam, the speeds of the two motor assemblies change with respect to each other in a sense such as to cause the shaft to move in a direction opposite to that originally taken. At this point, the motor or shaft will "unload"; and the reverse motion will gradually die as the motor picks up speed again. Thus, it is virtually impossible to overload the arrangement.

FIGURE 3 illustrates an especially useful arrangement 50 which includes a configuration in accordance with the invention for producing a reciprocating motion. The arrangement 50 is a cart having a structural platform 51 upon which is mounted a shaft 52 driven axially by a screw motor assembly 53 and a spline motor assembly 54. The shaft 52 rotates through a cross-head bearing 55 to drive a connecting rod assembly 56. The connecting rod assembly 56 is connected through a crank-shaft drive arrangement to an axle 57 which drives a pair of wheels 58. It should be noted that the two motors are designed to operate with a basic rotational speed differential in such a sense as to drive the shaft 52 in the direction of the arrow shown in FIGURE 3. The axial motion of the shaft 32 is limited by the ultimate forward motion of the connecting rod assembly 56. At this point, the inertia of the wheels 58 and the load placed upon the shaft 52 (and thus upon the screw motor assembly 53) cause the shaft 52 to retract and move in the opposite axial direction. The arrangement thereby furnishes reciprocating operational power for rotating the wheels 58. Such an arrangement is especially useful for driving any cart-like assembly. It is noted that this arrangement may also be incorporated with the features of a differential speed control for the motors in applications where maximum efficiency is desired.

The self-limiting mechanical movement of the arrangement of FIGURE 3 is especially advantageous in requiring no circuitry external to the two motor assemblies for accomplishing the variation of the speed of one of the motors. Other devices having like characteristics will be readily apparent to those skilled in the art. For example, a jack hammer arrangement in which the travel of the hammer is limited by a stop could make good use of the basic elements of the arrangement disclosed in FIGURE 3. Various pumps such as that disclosed in FIGURE 2 might also conveniently use the arrangement.

It should be noted that in each of these arrangements the power is provided in a substantially symmetrical manner such that the off-center characteristic of the step-up, step-down gearing normally provided for deriving reciprocating motion need not be used. Thus, the wear incident to the use of such off-center power transfer arrangements is eliminated.

It is also worth noting that the positioning of the motors coaxially about the reciprocating shaft, though not absolutely necessary to the operation of the shaft, allows the size of the arrangement to be reduced to such a point that the arrangement will prove practical for many uses where more bulky arrangements would simply not fit. It would, of course, be obvious to those skilled in the art to utilize an external shaft driven by splined and helical gears connected to the central shafts of a pair of identical motors. However, the coaxial design is my preferred embodiment.

Figure 4:
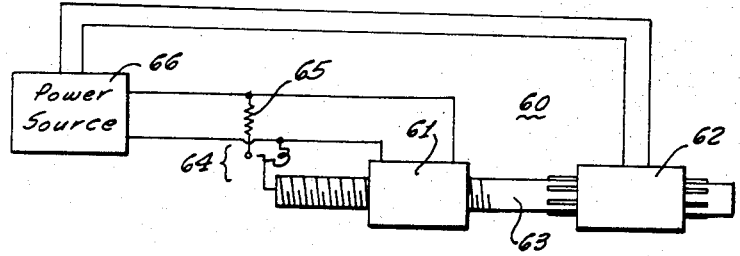
FIGURE 4 illustrates a first electrical arrangement for providing a particular variation in the speeds of two motors whereby a shaft may be caused to reciprocate in accordance with this invention.

In FIGURE 4 is shown an arrangement for causing a reciprocation of the shaft by an electrical scheme for interrupting the travel of the rotating shaft in its axial movement. The embodiment 60 comprises a threaded motor arrangement 61 and a splined motor arrangement 62 which encircle a central shaft 63. As the shaft moves to the left in response to a speed differential between the two arrangements 61 and 62, it reaches a point at which a switch 64 is caused to close. The closure is accomplished by a physical movement of one portion of the switch 64 into contact with the other portion through movement of the shaft 63. The closure of the switch 64 inserts a bypassing resistance across the line from the source of power 66, thereby varying the current through the motor arrangement 61, reducing the speed of the screw thread motor arrangement 61, and causing the shaft 63 to move to the right (as shown in FIGURE 4). As the shaft 63 moves to the right, the switch 64 is opened; and the entire available power from the source 66 is again directed to the arrangement 61, reversing the direction of operation so that the shaft 63 moves to the left. Obviously other arrangements, similar to that shown in FIGURE 4, could be constructed in which a switching means would cause a reversal of direction.

Figure 5:
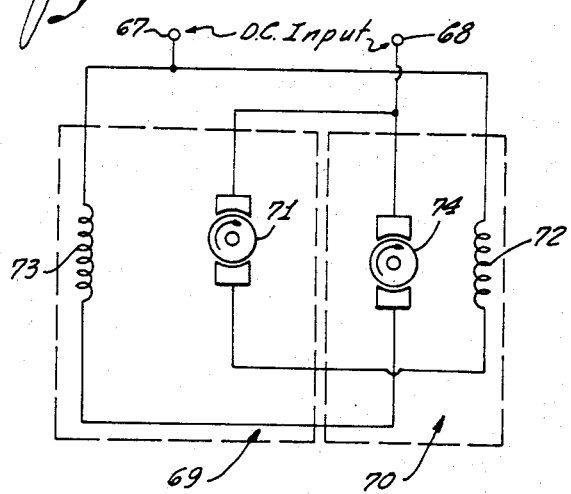
FIGURE 5 illustrates another electrical arrangement for providing reciprocating motion in accordance with the invention.

In FIGURE 5 is shown another embodiment of the arrangement for varying the differential speed of the motors; however, in this embodiment the arrangement is electrical rather than mechanical. A DC source of potential (not shown) is provided between the terminals 67 and 68 for operating the two motors 69 and 70. In this arrangement, the armature 71 of the first motor 69 is connected in series with the field winding 72 of the other motor arrangement 70. This entire circuit is in parallel with the series connection of the field winding 73 of the first motor 69 and the other armature winding 74. When the shaft (not shown) abuts at the end of its travel, the higher speed, threaded motor 69 is slowed and the current through armature winding 71 increases. This current also flows in the field coils 72 of the other motor 70, thereby increasing the speed of the second motor 70 above that of the first motor 69 and causing the reverse motion of the shaft to be implemented. The reciprocal action is enhanced as a result of the corresponding decrease in current through the armature winding 74 of the second motor 70 which decreases the field current of the now lower speed motor 69 causing a further speed reduction.

It will be obvious to those skilled in the art that various provisions might be made in the circuit of FIGURE 5 for start-up conditions and load control. However, these provisions are conventional.

Figure 6:
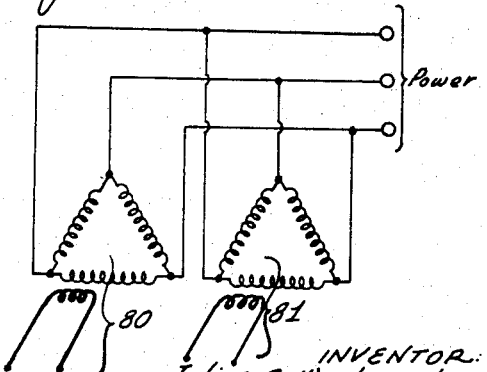
FIGURE 6 illustrates another electrical arrangement for providing reciprocating motion in accordance with the invention.

FIGURE 6 illustrates a second wiring scheme which utilizes the well-known hunting effect of polyphase synchronous machinery to accomplish the objects of the invention. Here one motor 80 (illustrated by delta-connected windings 80) is forced to synchronization more rapidly. The higher speed motor 80 is then forced out of synchronization as the shaft (not shown) abuts at the end of its travel and applies an increased torque via the threads. The other motor 81 is just pulling into synchronization as the abutment occurs. This dual action causes the second motor 81 to reinforce the synchronizing operation by increasing the rotational speed of the shaft as the speed of the motor 80 slows. When the motor 81 reaches synchronous speed, the travel of the shaft is in the opposite sense; and the cycle is repeated in the opposite sense as the shaft abuts the opposite terminus of travel and the motor 80 attempts to synchronize. Obviously, a comprehensive design of stroke and speed is dependent upon the lead angle of the screw, the inertial masses of the system, and the various load factors for these specific applications. However, all of these are well known to those skilled in the art of motor design (see for example, "Electric Machinery," Fitzgerald and Kingsley, McGraw-Hill, 1952). As explained above, the complete circuit would necessarily include provisions for start up and load adjustments.

It will be obvious from the above-disclosed arrangements that those skilled in the art may make various modifications, adjustments, and additional arrangements without departing from the concept of my invention. It is therefore my intention to be restricted only by the terms of the appended claims.

What is claimed is:

1. An arrangement for providing (cyclically-repeating axial) output motion comprising a rotatable shaft, first and second motors, means for causing said first motor to rotate said shaft without restricting the axial movement of said shaft, and means for causing said second motor to move said shaft axially when the speed of rotation of said shaft differs from a comparative rotational speed derived from said second motor.

2. An arrangement for providing output motion as claimed in claim 1 in which said first and second motors are positioned coaxially about said shaft.

3. An arrangement as claimed in claim 1 in which said means for rotating said shaft includes a spline arrangement having a first portion operatively connected with said first motor and a second mating portion operatively connected with said shaft.

4. An arrangement as claimed in claim 1 wherein said first and second motors are substantially identical, except that said first motor comprises a central, driven, splined portion for rotating the shaft, and said second motor comprises a central, driven, screw-threaded portion for moving the shaft axially as the speeds of said motors vary.

5. An arrangement as claimed in claim 1 comprising means for varying the speeds of said motors in a selected pattern.

6. An arrangement as claimed in claim 5 wherein said motor-speed-varying means comprises means for slowing the axial movement of said shaft.

7. An arrangement as claimed in claim 5 wherein said means for varying the speed of said motors comprises means for applying varying electrical signals to drive said motors.

8. An arrangement for providing bi-directional output motion comprising a rotatable shaft; first and second motors; means for causing said first motor to rotate said shaft without restricting the axial movement of said shaft; means for causing said second motor to move said shaft axially when the speed of rotation of said shaft differs from a comparative rotational speed derived from said second motor; and means for varying the speeds of said motors in a selected pattern, said last-mentioned means comprising means for slowing the axial movement of said shaft including a second shaft, and a connecting rod between said first shaft and said second shaft, said connecting rod being arranged to rotate said second shaft upon the axial movement of said first shaft.

9. An arrangement for providing bi-directional output motion of a shaft comprising a rotatable shaft; first and second motors; a means for causing said first motor to rotate said shaft without restricting the axial movement of said shaft; means for causing said second motor to move said shaft axially when the speed of rotation of said shaft differs from a comparative rotational speed derived from said second motor; and means for varying the speeds of said motors in a selected pattern comprising means for applying varying electrical signals to drive said motors including switching means arranged to vary the electrical current furnished to said motors after a predetermined axial movement of said shaft.

10. An arrangement for providing bi-directional output motion of a shaft comprising a rotatable shaft; first and second motors; a means for causing said first motor to rotate said shaft without restricting the axial movement of said shaft; means for causing said second motor to move said shaft axially when the speed of rotation of said shaft differs from a comparative rotational speed derived from said second motor; and means for varying the speeds of said motors in a selected pattern comprising means for applying varying electrical signals to drive said motors including means connecting said first and second motors in a synchronous arrangement.

11. An arrangement for providing bi-directional output motion of a shaft comprising a rotatable shaft; first and second motors; a means for causing said first motor to rotate said shaft without restricting the axial movement of said shaft; means for causing said second motor to move said shaft axially when the speed of rotation of said shaft differs from a comparative rotational speed derived from said second motor; means for varying the speeds of said motors in a selected pattern comprising means for applying varying electrical signals to drive said motors including a circuit connecting an armature winding of one of said motors in series with a field winding of the other said motors across a source of direct-current input potential and connecting an armature winding of the other of said motors in series with the field winding of said one of said motors across said source of direct-current potential.

12. An arrangement including a rotatable shaft, first and second motors, means for causing said first motor to rotate said shaft without restricting the axial movement of said shaft, means for causing said second motor to move said shaft axially when the speed of rotation of said shaft differs from a comparative rotational speed derived from said second motor, and pumping means driven by at least one end of said shaft.

References Cited
UNITED STATES PATENTS

| | | | |
|---|---|---|---|
| 1,413,982 | 4/1922 | Gill | 74—424.8 |
| 2,023,841 | 12/1935 | Kingsbury | 74—424.8 |
| 2,520,014 | 8/1950 | Rehnberg et al. | 74—424.8 X |
| 2,547,079 | 4/1951 | Gerentes | 74—424.8 |
| 2,630,022 | 3/1953 | Terdina | 74—424.8 |
| 2,860,266 | 11/1958 | Schrader. | |
| 2,956,188 | 10/1960 | White | 74—424.8 X |

FRED C. MATTERN, JR., *Primary Examiner.*

L. H. GERIN, *Assistant Examiner.*